Patented July 29, 1947

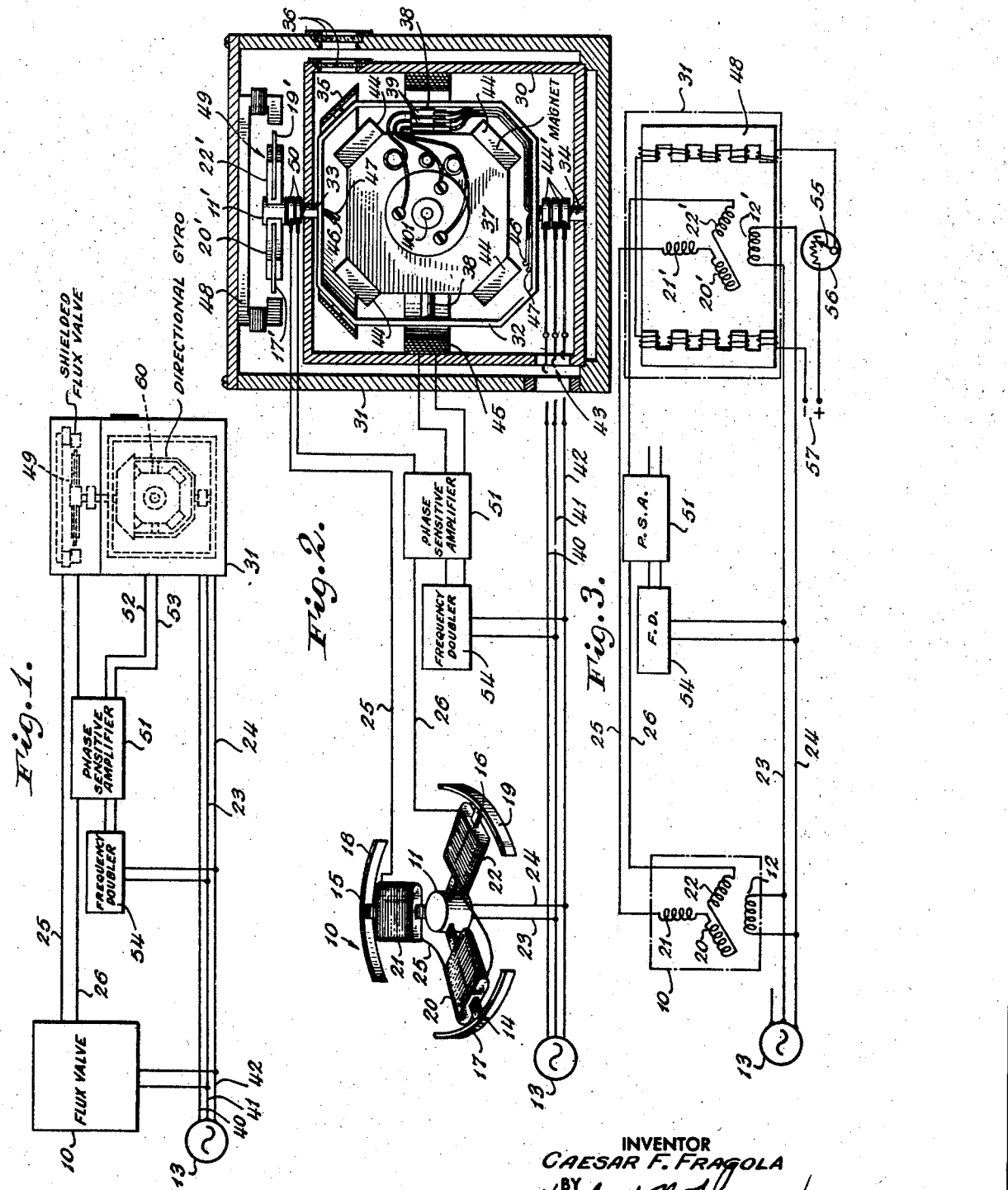

2,424,562

UNITED STATES PATENT OFFICE 2,424,562

GYRO FLUX VALVE COMPASS SYSTEM

Caesar F. Fragola, East Hempstead, N. Y., assignor to Sperry Gyroscope Company, Inc., a corporation of New York Continuation of application Serial No. 436,965, March 31, 1942. This application March 31, 1944, Serial No. 528,838

15 Claims. (Cl. 33—204)

This invention relates to a gyro flux valve compass system or a gyro compass system in which control is exercised by the flux valve arrangement or signal voltage-producing means therein over a directional gyro type of gyroscopic instrument.

The present application is a continuation of my copending application Serial No. 436,965, filed in the U. S. Patent Office on or about March 31, 1942.

The primary object of the invention resides in obtaining the desired control over the gyro instrument by means of a circuit in which the outputs of separate flux valve units are compared, one of such units being responsive to the earth's magnetic field and the other being responsive to an artificial field, the position of the latter flux valve relative to the direction of the artificial field being controlled by the gyro.

Another object of the invention resides in providing a gyro flux valve compass system of the foregoing character in which shielding means are employed to shield that flux valve, which is responsive to the artificial field, from the earth's field; and still another object resides in rendering the artificial field sufficiently strong as to buck out the earth's field thereby rendering the one flux valve responsive wholly to the artificial field.

Another feature of the invention consists in the utilization of a control circuit for the system including a phase sensitive amplifier in which the outputs of the respective flux valve units are opposed.

Other features and structural details of the invention will be apparent from the following description when read in connection with the accompanying drawings, wherein Fig. 1 is a diagrammatic view showing a desired arrangement of the parts constituting one embodiment of the improved gyro flux valve compass system of my invention;

Fig. 2 is a view somewhat similar to Fig. 1 but of a modified form of my invention, including a detail perspective view of the fixed flux valve unit employed and further including a side elevation view of the directional gyro unit employed; and Fig. 3 is a partial wiring diagram showing the arrangement of the respective flux valves in the control circuit of the system.

With reference to the drawings, one of the controlling units of the embodiments of my invention is formed by a single flux valve as indicated at 10. This unit is fixed in position on the vehicle in which the system is employed and is responsive to the horizontal component of the earth's magnetic field. While only one of such units is shown in the drawings, it will be understood that a number of spaced units could readily be employed in this connection, the outputs of which could be suitably combined for the purposes of use in the present system. Furthermore, the unit or units may be pendulously mounted or stabilized in any desired manner to subject it or them to the horizontal component of the earth's field.

While any type of flux valve unit 10 may be employed, I have shown in Fig. 2 for inclusion in the improved system, a three-legged flux valve unit. This unit, as understood in the art and more particularly described in the application for Letters Patent to John C. Purves and Lennox F. Beach, for Flux valve compasses, Serial No. 385,622, filed March 28, 1941, which issued August 28, 1945, as Patent No. 2,383,460, includes a central button 11 which contains an exciting primary winding 12 (Fig. 3) energized from a suitable source of alternating current indicated at 13. Extending in a radial direction from the central button 11 are three permeable arms 14, 15 and 16 at the ends of which the earth's field collectors 17, 18 and 19 are respectively mounted. The secondary windings 20, 21 and 22 for the flux valve encircle the respective equidistantly spaced arms 14, 15, and 16. Energy to the primary winding 12 from source 13 is supplied by way of leads 23 and 24. Output coil windings 20, 21, and 22 may be connected in series as clearly shown in Fig. 3 and the leads 25 and 26 therefrom are included in the control circuit of the system.

The controlled instrument is a directional gyro of conventional form as shown in Fig. 2. In the embodiment shown, therein, the gyroscopic device, enclosed in casing 30, is mounted within an outer casing 31. The directional gyro instrument includes the usual vertical ring 32 which is pivotally mounted on a vertical axis within the casing 30 by means of trunnions 33 and 34. A compass card 35 is situated on the vertical ring 32 and is observable through the adjacent windows 36 contained in the respective casings 30 and 31. The sensitive element or gyro rotor (not shown) of the instrument is mounted within the rotor bearing case 37 which is pivotally mounted on a horizontal axis on the vertical ring 32 by means of trunnions 38. The spin axis of the gyro rotor is normal to the plane of the paper in Fig. 2, the position of the same being indicated by the extending shaft 40I. In the form of directional gyro instrument illustrated, the gyro rotor is spun electrically by means of a suitable driving motor (not shown) provided within the rotor bearing case 37. Alternating current energy is provided to spin the gyro rotor from the source 13 by way of leads 40, 41, and 42, jack connection 43 and cooperating groups of slip rings 44' located on trunnion 34 and a second group 39 located on trunnion 38.

Control over the directional gyro instrument above described and the similar instrument designated at 60 in Fig. 1 is exerted through a precessing means for changing the azimuthal position of the gyro, shown by the compass card 35 as the position of the vertical ring 32 with respect to the earth's magnetic field. The precessing means in conventional manner exerts a torque about the horizontal axis of the gyro rotor bearing case 37 and consequently effects a desired movement of the ring 32. The precessing means is electromagnetic in the instant case, the same including permanent magnet elements 44 which are fixed in position on the rotor bearing case 37 and a stationary centrally located coil 45 which encircles the vertical ring 32 of the instrument and is fixed to the interior surface of casing 30. Control over the precessing means shown for the directional gyro instrument is exerted by means of the circuit hereinafter described.

The other of the flux valve units employed in the system is contained within the casing 31 and is mounted to rotate in azimuth under control of the gyro instrument. This is effected in the present instance by extending the upper trunnion 33 through the top of casing 30 and directly mounting the flux valve unit thereon. This unit is of the same type as illustrated in detail in the perspective view of the same in Fig. 2, the respective windings thereof being indicated at 12', 20', 21', and 22'. The primary or exciting winding 12' of the valve is energized from source 13 by way of leads 46 and 47 which are shown in Fig. 2 as originating at slip ring 44' and extending through a central opening in the upper trunnion 33. Button 11', coils 20' and 22', and field collectors 17' and 19' are illustrated in the casing 31, these parts being understood to correspond to the previously described valve unit which is responsive to the earth's magnetic field. An artificial magnetic field of a given relatively constant intensity is provided to effect operation of the second flux valve unit in the form of an electromagnetic element indicated at 48, the respective poles of which are adjacent the flux valve unit which is designated generally at 49 in Figs. 1 and 2.

Preferably as shown in Fig. 1, the outer casing 31 is formed of suitable magnetic material to shield the flux valve mounted therein from the earth's magnetic field. For this purpose, of course, the shielding casing may be mounted on top of the gyroscope casing 30 to surround the flux valve instead of enclosing both the flux valve and gyroscope as illustrated. Alternatively, as shown in Fig. 2, the casing 31 may serve merely as a housing for the flux valve and gyroscope units, being formed of any mechanically suitable material. In this event, the field of the electromagnet is made sufficiently strong as to buck out the earth's field and render the flux valve responsive or sensitive to the artificial field only. In other words, the artificial field serves to render the flux valve relatively insensitive or unresponsive to the relatively weak earth's field so that it is shielded in that sense.

It is desirable that the artificial field for flux valve 49 be provided by an electromagnet in order to permit the intensity of the controlling field to be varied to correspond with a given intensity of the earth's horizontal field. In this case, the electromagnet is shown fixed in position within the casing 31 and the flux valve 49 is mounted to rotate in azimuth with relation thereto. It will be understood, however, that for the purposes of the present invention it would be equally effective to fix the position of the flux valve unit and mount the artificial field producing element so as to control the same from the directional gyro and such a reversed arrangement of the parts could be made without departing from the inventive concepts disclosed.

A desirable form of electromagnetic element 48 is shown in an illustrative manner in Fig. 3, in which element 48 is formed of a plurality of parallel arranged, oppositely facing, pole pieces each of which are energized by an independent coil. The coils are connected in series in a circuit which includes a suitable direct current source 57 and a rheostat 56, the movable arm 55 of which cooperates with an index or dial calibrated in values of the horizontal component of the arth's magnetic field for different latitudes. Thus by setting the rheostat arm to the particular field intensity desired from element 48 the accuracy of the system could be improved for all points on the earth. It will be understood that when the system is operating at a point on the earth which has a strong horizontal field vector, the artificial field of the electromagnetic element 48 must be relatively strong, and correspondingly, when the horizontal field of the earth is weak, the electromagnetic artificial field should be relatively weak. It is obvious that the invention is not limited in use to a particular type of electromagnetic or other element for producing the desired artificial field. In order to handle the output of the flux valve unit, slip rings 50 are provided mounted on the extension of the vertical ring trunnion 33 in the present instance.

The outputs of the two-flux valve unit are connected together in opposed or bucking relation and in circuit with a phase sensitive amplifier 51. Lead 25 is common to both flux valves and leads 26 connect the flux valves with the phase sensitive amplifier as shown. Amplifier 51 is energized from the source of alternating current 13 through a suitable frequency doubler indicated generally at 54. A more detailed description of a preferred form of phase sensitive amplifier and frequency doubler will be hereinafter set forth.

At this point, however, it is believed that a brief description of the cooperation between the two flux valves in providing a signal voltage output to the phase sensitive amplifier will promote a better understanding of the invention. Let us assume that both flux valves 10 and 49 occupy electrically equivalent positions relative to the magnetic fields to which they are respectively subjected and that the signal voltage outputs thereof are of equal and opposite values, no potential difference will exist and zero signal voltage will be supplied to the phase sensitive amplifier. However, as soon as one of the flux valves departs from the above assumed position thereof while, for example, the other flux valve remains in its assumed position, an unbalance therebetween in the magnitude of their voltage outputs will exist and a signal voltage of one phase sense or the other will be fed to the phase sensitive amplifier. The phase sensitive amplifier, being connected through leads 52 and 53 with the gyro-precessing means or coil 45, controls the operation of the precessing means to exert a torque in one direction or the other, depending upon the phase sense of the signal voltage supplied thereto to cause the gyro to precess in a direction to restore the above assumed relationship of the flux valves wherein their voltage outputs are equal and opposed and, therefore, reduce to zero.

In connection with the embodiment of my invention, illustrated in Fig. 1, wherein the flux valve, associated with the gyro, is shielded from the earth's magnetic field, it will be noted that the artificial field may be of substantially the same order of intensity as the earth's field, and under these conditions the two flux valves may be of substantially identical construction, so that their voltage outputs will be substantially equal in magnitude. In other words, either the strength of the artificial field may be initially adjusted to provide equal and opposite signal voltage outputs, or, of course, the flux valves, such as windings 20, 21 and 22 or 20', 21' and 22' thereof, may be arranged such that for the given field intensities, their outputs are equal. Of course, the comparison and regulation of the flux valve outputs for equal and opposite values will be made when corresponding coils thereof occupy equivalent electrical positions in the respective fields.

Where the flux valve 49 is, in effect, shielded from the earth's field by the artificial field, as in the embodiment of Fig. 2, the artificial field will be much stronger than the earth's field, with the result that if the two flux valves are of substantially identical design, the voltage output of flux valve 49 will exceed that of flux valve 10. Voltage dividers or other suitable means may be used to equalize these voltages, or, similarly, flux valve 49 may be designed to provide voltage outputs equal to those derived from flux valve 10, when subjected to an artificial field of predetermined intensity.

The foregoing described control over the magnitude of the signal voltage outputs of flux valve 49 may be carried out without in any way interfering with the further adjustment provided by rheostat 56 in controlling the intensity of the artificial field. For example, the outputs of the flux valves may be adjusted at any given position over the earth's surface and thereafter an adjustment of rheostat 56 would serve to preserve this adjustment for the particular geographical location to which the instrument may be moved.

The phase sensitive amplifier 51 may, for example, comprise a circuit including two stages of voltage amplification and a phase discriminating stage which may include a twin triode tube across the plates of which is connected the precessing coil 45. An alternating potential may be supplied to the plates of the twin triode tube from a suitable frequency doubling device 54. For this purpose, I may employ a full wave rectifier which is connected across the source of alternating current energy used in energizing the exciting winding of the flux valves. Furthermore, a voltage doubler may be employed to supply direct current plate voltage to the plates of the amplifier tubes and also, through modulation by the energy from the said alternating current energy source, to supply double frequency alternating current energy to the phase discriminating stage of the amplifier. This double frequency energy will, of course, be of the same frequency as that of the output of the flux valves.

In practice, the operation of my gyro flux valve system is as follows. The flux valve 10 and the casing of the gyro are mounted upon a craft and turn in azimuth therewith. Assuming that a vertical plane through the flux valve 10 lies in a magnetic north-south plane and that a similar plane through the flux valve 49 lies in alignment with the unidirectional field created by the electromagnetic device 48 and that for these positions of the flux valves their outputs are equal, no signal current will flow from the phase sensitive amplifier circuit to the precessing coil 45 because the outputs of the flux valves are connected in opposition. It may also be assumed that for the above-mentioned positions of the flux valves the vertical ring of the gyro also lies in a north-south plane. Upon a turning movement of the craft in azimuth, the flux valve 10 will rotate therewith and relative to the earth's magnetic field. Also the electromagnetic, artificial field-creating device 48 will move in azimuth with the craft and relative to the flux valve 49 which, being associated with the vertical ring of the gyro and movable in azimuth thereby, remains stationary. Under these conditions, the change in the output from flux valve 10 will represent the angular movement of said flux valve relative to the earth's field, and the change in the output from flux valve 49 will likewise represent the angular change in relationship of said flux valve relative to the artificial field. Since these angular changes will be equal for all turning movements of the craft in azimuth, no resultant signal will be produced which will effect an operation of the precessing coil 45.

However, should the gyro wander from its predetermined north-south position of orientation, flux valve 49 will be angularly moved in the artificial field to which it is subjected while, for this movement of the vertical ring, the position of flux valve 10 relative to the earth's field will remain the same. Under this condition, the output from the respective flux valves will be unequal and the phase and magnitude of the resultant signal will depend upon the direction and magnitude of movement of the vertical ring of the gyro away from its predeterminately oriented or north-south position. The phase sensitive amplifier circuit will therefore effect an energization of coil 45 to cause the vertical ring of the gyro to precess back to the position from which it has wandered.

Accordingly, it should be evident from the above-described operation of my present invention that the flux valves cooperate to correct for wandering of the gyro and serve to maintain the vertical ring thereof substantially in a predetermined position of orientation.

In the foregoing, I have described my invention as comprising flux valves for providing signal voltage outputs, it being understood that by this term I mean to include other and similar devices which will function to provide signal voltages of magnitudes dependent upon the positions thereof with respect to the direction of an external magnetic field.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro magnetic compass for craft, comprising a first means adapted to be fixed on the craft and adapted to supply signal voltage outputs dependent in magnitude upon the position thereof in the earth's field, a directional gyro, precessing means for positioning said gyro in azimuth, a second means responsive to the magnetic field in which it is located for supplying signal voltage outputs dependent in magnitude upon the position thereof in said field, means for creating at said second means an artificial field much stronger than the earth's field at said means, means for supporting said second signal voltage-supplying means and said field-creating means in relatively rotatable relation, means for effecting relative rotation of said second signal voltage-supplying means and artificial field by said gyro when relative azimuthal movements of said craft and gyro occur, and means responsive to the outputs of both of said signal voltage-supplying means for controlling in accordance with the difference between the outputs of the two voltage-supplying means the operation of said gyro-precessing means to maintain the azimuthal position of the gyro substantially constant in relation to the earth's field.

2. A gyro compass system of the character recited in claim 1, in which at least one of the signal voltage-supplying means constitutes a flux valve.

3. A gyro flux valve compass system for craft comprising a flux valve, a directional gyro, precessing means for positioning said gyro in azimuth, a second flux valve, means for creating at said second flux valve an artificial field much stronger than the earth's field at said second valve, means for supporting said second flux valve and field-creating means in relatively rotatable relation, means for effecting relative rotation of said second flux valve and field by said gyro when relative azimuthal movement of said craft and gyro occurs, and means responsive to the outputs of said flux valves for controlling in accordance with the difference between the outputs of the two flux valves the operation of said gyro-precessing means to maintain the azimuthal position of the gyro substantially constant in relation to the earth's field.

4. A gyro flux valve compass system for moving craft comprising a flux valve, a directional gyro, precessing means for positioning said gyro in azimuth, a second flux valve, means for creating at said second flux valve an artificial field, means for shielding said second flux valve from the earth's field, means for supporting said second flux valve and field-creating means in relatively rotatable relation, means for effecting relative rotation of said second flux valve and field by said gyro when relative azimuthal movement of said craft and gyro occurs, and means responsive to the outputs of said flux valves for controlling in accordance with the difference between the outputs of the two flux valves the operation of said gyro-precessing means to maintain the azimuthal position of the gyro substantially constant in relation to the earth's field.

5. A gyro flux valve compass system comprising a flux valve, a directional gyro including a vertical ring and a gyro rotor bearing case pivotally mounted on a normally horizontal axis on said ring, precessing means for changing the azimuthal position of the vertical ring of the gyro, a second flux valve, means for creating at said second flux valve an artificial field much stronger than the earth's field at said second flux valve, means under control of the vertical ring of the gyro for positioning the second flux valve relative to its artificial field, said artificial field-creating means and first-mentioned flux valve being adapted to be fixed to move in azimuth with the vessel on which the system is mounted, and a control circuit for said precessing means in which the outputs of the respective flux valves are opposed to maintain the azimuthal position of the gyro substantially constant in relation to the earth's field.

6. A gyro flux valve compass system comprising a flux valve, a directional gyro including a vertical ring and a gyro rotor bearing case pivotally mounted on a normally horizontal axis on said ring, precessing means for changing the azimuthal position of the vertical ring of the gyro, a second flux valve, means for creating at said second flux valve an artificial field much stronger than the earth's field at said second valve, means for shielding said second flux valve from the earth's field, means under control of the vertical ring of the gyro for positioning the second flux valve relative to its artificial field, said artificial field-creating means and first-mentioned flux valve being adapted to be fixed to move in azimuth with the vessel on which the system is mounted, and a control circuit for said precessing means in which the outputs of the respective flux valves are opposed to maintain the azimuthal position of the gyro substantially constant in relation to the earth's field.

7. A gyro flux valve compass system as claimed in claim 1 in which the intensity of the artificial field is adjustable to correspond in strength with the horizontal field intensity of the earth at a particular point thereat.

8. A gyro flux valve compass system comprising a flux valve, a directional gyro including a vertical ring, precessing means for positioning said vertical ring in azimuth, a second flux valve, means for creating at said second flux valve an artificial field much stronger than the earth's field at said second valve, means for supporting said second flux valve and field-creating means in relatively rotatable relation and one of said supporting means being operatively connected to rotate with the vertical ring of said gyro, the other of said supporting means and said first-mentioned flux valve being adapted to be mounted to move together in azimuth, and means responsive to the outputs of said flux valves for controlling in accordance with the difference between the outputs of the two flux valves the operation of said gyro-precessing means to maintain the azimuthal position of the gyro substantially constant in relation to the earth's field.

9. A gyro flux valve compass system comprising a flux valve, a directional gyro including a vertical ring, precessing means for positioning said vertical ring in azimuth, a second flux valve, means for creating at said second flux valve an artificial field much stronger than the earth's field at said second valve, means for supporting said second flux valve and field-creating means in relatively rotatable relation and one of said supporting means being operatively connected to rotate with the vertical ring of said gyro, the other of said supporting means and said first-mentioned flux valve being adapted to be mounted to move together in azimuth, and an electrical circuit connected to receive the outputs of said flux valves and including phase sensitive means for controlling said gyro-precessing means in accordance with the difference between the outputs of the two flux valves to maintain the azimuthal position of the gyro substantially constant in relation to the earth's field.

10. A gyro flux valve compass system of the character recited in claim 3, further including means for controlling the amount of artificial field flux to which said second flux valve is subjected, whereby the outputs of both valves may be matched at any given zone over the earth's surface when both valves lie in corresponding positions relative to the fields to which they are subjected.

11. A gyro flux valve compass system comprising a first flux valve adapted to be mounted to rotate in azimuth with the vessel on which the system is employed, a directional gyro, precessing means for changing the azimuthal position of the gyro, a second flux valve responsive to the magnetic field in which it is located, means for creating at said second flux valve an artificial field much stronger than the earth's field at said second flux valve, said second flux valve being rotatably positioned in said artificial field by said directional gyro, said field-creating means being fixed against azimuthal rotation relative to said first flux valve, and circuit means for controlling said gyro precessing means in accordance with the difference between the outputs of the two flux valves to maintain the azimuthal position of the gyro substantially constant in relation to the earth's field.

12. A gyro flux valve compass system comprising a first flux valve adapted to be mounted to rotate in azimuth with the vessel on which the system is employed, a directional gyro, precessing means for changing the azimuthal position of the gyro, a second flux valve responsive to the magnetic field in which it is located, means for creating at said second flux valve an artificial field much stronger than the earth's field at said second flux valve, said second flux valve being rotatably positioned in said artificial field by said directional gyro, means for shielding said second flux valve from the earth's field, said field-creating means being fixed against azimuthal rotation relative to said first flux valve, and circuit means for controlling said gyro precessing means in accordance with the difference between the outputs of the two flux valves to maintain the azimuthal position of the gyro substantially constant in relation to the earth's field.

13. A gyro compass system of the character recited in claim 1 in which the means responsive to the outputs of both of the signal voltage supplying means comprises a phase-sensitive amplifier.

14. A gyro compass system of the character recited in claim 4 in which the means responsive to the outputs of both of the flux valves comprises a phase-sensitive amplifier.

15. A gyro compass system of the character described comprising a first means adapted to supply signal voltage outputs dependent in magnitude upon the position thereof in the earth's field and adapted to be mounted to rotate in azimuth with the vessel on which the system is employed, a directional gyro, precessing means for changing the azimuthal position of the gyro, a second means responsive to the magnetic field in which it is located for supplying signal voltage outputs dependent in magnitude upon the position thereof in said field, means for creating at said second signal voltage-supplying means an artificial field much stronger than the earth's field at said second voltage-supplying means, said second voltage-supplying means and said artificial field-creating means being relatively rotatable and one thereof being operatively connected to rotate with said gyro and the other thereof being adapted to be mounted on said vessel to rotate therewith in azimuth, and circuit means for controlling said gyro precessing means in accordance with the difference between the voltage outputs of both of said signal voltage-supplying means to maintain the azimuthal position of the gyro substantially constant in relation to the earth's field.

CAESAR F. FRAGOLA.